(No Model.)
J. DAY.
WINDOW SHADE PULL.
No. 294,449. Patented Mar. 4, 1884.
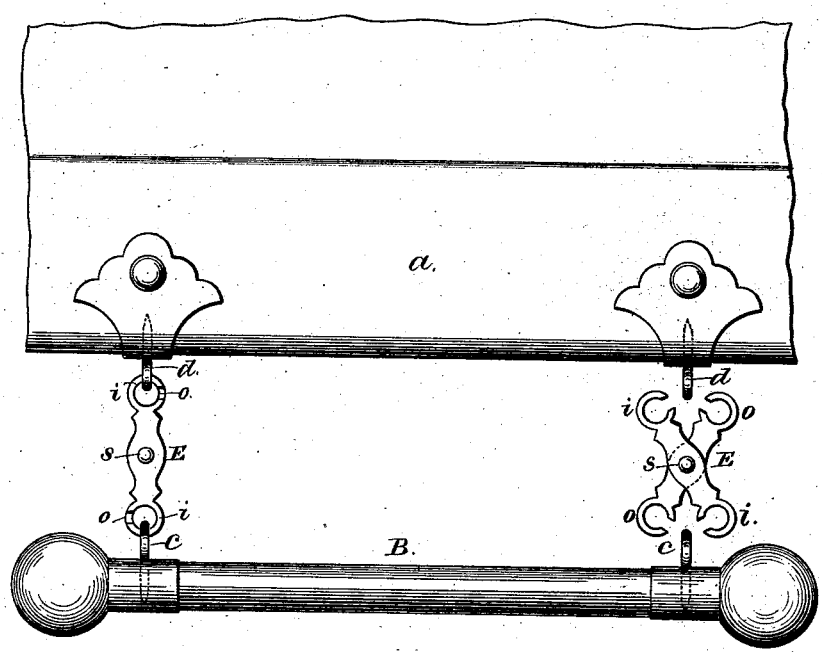
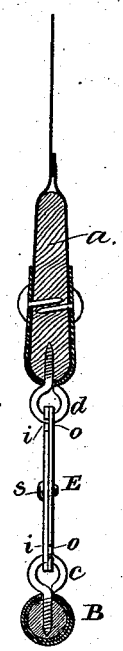
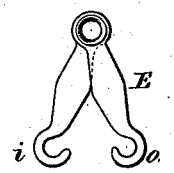
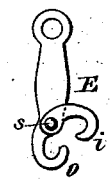
Witnesses
Chas. H. Smith
J. Staib
Inventor
John Day
per Lemuel W. Serrell
atty

UNITED STATES PATENT OFFICE.

JOHN DAY, OF BROOKLYN, NEW YORK.

WINDOW-SHADE PULL.

SPECIFICATION forming part of Letters Patent No. 294,449, dated March 4, 1884.

Application filed January 9, 1884. (No model.)

*To all whom it may concern:*

Be it known that I, JOHN DAY, of Brooklyn, in the county of Kings and State of New York, have invented an Improvement in Window-Shade Pulls, of which the following is a specification.

Window-shade pulls are usually suspended below the shade-slat by hooks or chains passing to screw-eyes. When the hooks are used they do not have a finished appearance. These hooks are sometimes in the form of chain-links, and are closed by pressure after the parts are in place. In some instances spring-hooks have been used; but they are not ornamental, and are liable to be bent by the sudden pull to which they are subjected. I make use of links having two hooks, that close in opposite directions, and grasp the respective eyes upon the shade bar and slat. These hooks usually are made of sheet metal, and can be ornamented to any desired extent and have a finished appearance, and are very strong.

In the drawings, Figure 1 is an elevation of the shade-bar with one link closed and the other open ready to be closed. Fig. 2 is an edge view endwise of the pull. Figs. 3 and 4 represent modifications of the double hook-link.

The slat $a$ for the window-shade and the bar or pull B are of any desired character. Upon the bar or pull B there is an eye, $c$, that is attached to or formed as part of the pull or bar, and the eye $d$ is upon the slat A, usually screwed thereto. The link E is made with two hooks closing in opposite directions. Usually there will be two links to each pull or bar, as shown. Each link has two separate pieces pivoted or fastened together, and the hooks $i$ $o$ stand in opposite directions and face each other, so as to be closed upon and hook into the eye $c$ upon the pull, or the eye $d$ upon the slat, or both.

In Fig. 1 the links are shown with hooks at both ends standing in opposite directions, the pivot $s$ being in the middle; but as it is usually only necessary to hook or unhook one end of the link E, I have shown in Fig. 3 the pivot $s$ near one end and the hook $i$ attached thereby to the body of the link, and in Fig. 4 the hooks are pivoted together by an eyelet, and that eyelet forms the opening for one of the eyes $c$ or $d$. As the hooks may be made in various ways, so as to close in opposite directions, I do not limit myself in this particular, but prefer hooks made of plates that are pivoted by a rivet, so as not to turn too easily, but comparatively hard, so as not to become unhooked.

I claim as my invention—

The combination, with the bar and screw-eyes in a shade-pull, of a connecting-link having two hooks, that stand in opposite directions and grasp the eye when closed, substantially as set forth.

Signed by me this 4th day of January, A. D. 1884.

JOHN DAY.

Witnesses:
GEO. T. PINCKNEY,
HAROLD SERRELL.